United States Patent
Mbodji et al.

(10) Patent No.: US 12,391,788 B2
(45) Date of Patent: Aug. 19, 2025

(54) TWO-COMPONENT POLYURETHANE COMPOSITION FOR THE PRODUCTION OF LARGE SCALE MODELS AND TOOLS BY 3D PRINTING

(71) Applicant: SIKA TECHNOLOGY AG, Baar (CH)

(72) Inventors: Mame Mbodji, Saint Ouen l'Aumone (FR); Nicolas Bernardini, Eaubonne (FR); Fleur Chaignon-Lesetre, Serifontaine (FR); Didier Lootens, Küsnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 716 days.

(21) Appl. No.: 17/624,474

(22) PCT Filed: Jul. 2, 2020

(86) PCT No.: PCT/EP2020/068664
§ 371 (c)(1),
(2) Date: Jan. 3, 2022

(87) PCT Pub. No.: WO2021/001479
PCT Pub. Date: Jan. 7, 2021

(65) Prior Publication Data
US 2022/0363806 A1  Nov. 17, 2022

(30) Foreign Application Priority Data

Jul. 2, 2019 (EP) .................................. 19183930

(51) Int. Cl.
| | |
|---|---|
| *C08G 18/48* | (2006.01) |
| *B29C 64/112* | (2017.01) |
| *C08G 18/32* | (2006.01) |
| *C08G 18/50* | (2006.01) |
| *C08K 5/11* | (2006.01) |
| *C08K 7/26* | (2006.01) |
| *C08K 7/28* | (2006.01) |
| *B29K 75/00* | (2006.01) |
| *B33Y 10/00* | (2015.01) |
| *B33Y 70/10* | (2020.01) |
| *B33Y 80/00* | (2015.01) |

(52) U.S. Cl.
CPC ........ *C08G 18/4841* (2013.01); *B29C 64/112* (2017.08); *C08G 18/3243* (2013.01); *C08G 18/5021* (2013.01); *C08K 5/11* (2013.01); *C08K 7/26* (2013.01); *C08K 7/28* (2013.01); *B29K 2075/00* (2013.01); *B33Y 10/00* (2014.12); *B33Y 70/10* (2020.01); *B33Y 80/00* (2014.12)

(58) Field of Classification Search
None
See application file for complete search history.

(56) References Cited

U.S. PATENT DOCUMENTS

| | | |
|---|---|---|
| 9,453,142 B2 | 9/2016 | Rolland et al. |
| 2009/0214873 A1 | 8/2009 | Demmig |
| 2010/0297427 A1 | 11/2010 | Schlingloff et al. |
| 2014/0124135 A1 | 5/2014 | Linnenbrink et al. |

FOREIGN PATENT DOCUMENTS

| | | |
|---|---|---|
| CN | 104479343 A | 4/2015 |
| CN | 106142564 A | 11/2016 |
| EP | 2 700 666 A1 | 2/2014 |
| EP | 2 740 750 A1 | 6/2014 |
| WO | 02/48228 A2 | 6/2002 |
| WO | 2014/011375 A1 | 1/2014 |
| WO | 2018/095962 A1 | 5/2018 |
| WO | 2018/157148 A1 | 8/2018 |

OTHER PUBLICATIONS

Sep. 14, 2020 International Search Report issued in International Patent Application No. PCT/EP2020/068664.
Sep. 14, 2020 Written Opinion of the International Searching Authority issued in International Patent Application No. PCT/EP2020/068664.

*Primary Examiner* — Fred M Teskin
(74) *Attorney, Agent, or Firm* — Oliff PLC

(57) ABSTRACT

A two-component polyurethane compositions including (i) a polyol component A comprising a tri- or higher functional polyol P1 having an OH equivalent weight of from 60 g/mol to 250 g/mol and a di- or tri-functional polyether or polyester polyol P2 which is different from the polyol P1; and (ii) an isocyanate component B comprising at least one polyisocyanate I. Polyurethane compositions have surprisingly been found to be suitable for 3D printing processing, where they provide printed 3D objects with reduced tackiness even shortly after the printing. In addition, the invention provides processes for the production of three dimension objects form such compositions as well as three dimensional objects prepared accordingly and the use of corresponding compositions in 3D printing processes.

6 Claims, No Drawings

TWO-COMPONENT POLYURETHANE COMPOSITION FOR THE PRODUCTION OF LARGE SCALE MODELS AND TOOLS BY 3D PRINTING

TECHNICAL AREA

The invention concerns two-component polyurethane compositions which are suitable for the production of large scale model and tools by 3D printing, processes for the production of three dimension objects from such compositions as well as three dimensional objects prepared accordingly and the use of corresponding compositions in 3D printing processes.

STATE OF THE ART

In recent years, 3D printing has become a more and more competitive method for the fast and easy production of three-dimensional objects. These days, it is used primarily in the commercial sector, for example for prototypes or design studies, as a fast and flexible alternative to injection molding and allows for the production of smaller objects with virtually no limitations to their shape. The 3D printing process is also referred to as free-form construction or additive manufacturing (AM).

Typical printing materials for 3D printing are thermoplastics such as polylactic acid (polylactides, PLA) or acrylonitrile-butadiene-styrene (ABS), which are heated and applied pointwise or layerwise in the plastic state and then rapidly set and solidify. Most of the material is applied via a movable printhead, which is controlled by a computer. The polymers acquire sufficient strength by cooling to maintain the given shape. However, because the materials are thermoplastic and need to have a sufficiently low melting range for practical application, the molded articles made from such materials are chemically and physically limited, particularly in terms of chemical resistance, heat resistance, weatherability and mechanical properties such as elasticity and toughness. In addition, the 3D printing process is limited in that heatable 3D printing elements are required by the necessary heating of the materials and the process becomes relatively slow as the cooling process with the solidification of the printed materials limits the printing speed.

Recently, there have been attempts to use materials based on thermosetting or elastomeric materials, which rapidly cure chemically during or after printing, as a substitute of the common thermoplastic printing materials. The chemical basis of such printing materials are e.g. RTV-2 silicones, two-component epoxy materials or two-component polyurethanes. Two-component materials are advantageous, if not essential, in such processes, as the highly reactive constituents such as hardener and binder are initially present separately and begin to cure only during or after the mixing of the two components. For the curing reaction, it is important that it proceeds rapidly so that the 3D printing process can be carried out at a practicable speed. In addition, it is important that the curing can take place homogeneously in deeper layers and does not depend on external curing factors such as humidity.

This is not easy to achieve. The two-part compositions must be reactive enough with each other that a rapid 3D printing process is possible. On the other hand, such two-component compositions already begin to react upon mixing, resulting in a rapid increase in viscosity. This is a problem for 3D printing, since a homogeneous mixture must be obtained and therefore a certain residence time in a static or dynamic mixer is needed. If the reactivity is too high, the viscosity increases significantly by progressive curing already in the mixer and a precise, constant application becomes difficult and at least the mixing and application time is significantly reduced. This is difficult to control even with heating or otherwise, especially as the chemical curing reaction is usually further accelerated by heating. In the worst case, the application nozzle clogs or the material on placement on the object to be formed no longer has sufficient fluidity to form a uniform assembly with the underlying material. This is highly undesirable.

The patent application CN 104479343 A describes two-component polyurethane compositions comprising a polyol, a polyisocyanate and a curing catalyst, which are applied in a 3D printing process. However, these compositions must be precisely tailored to the 3D printer to avoid the problems described above as much as possible. In general, the challenge remains to set the composition to cure quickly enough to allow a practicable printing process, yet not clog the 3D printer because the cure progresses too fast. At the same time, efficient pumping and mixing mechanisms are needed for the mixture, which is constantly thickening due to the progressive curing.

A more controllable process is taught in U.S. Pat. No. 9,453,142 B2, which discloses a polyurethane composition comprising a blocked polyisocyanate and a photoactivatable chemical cure mechanism. Although this method solves the problem of cure control, it depends on complex, expensive raw materials and requires a suitable light source for curing.

The document CN 106142564 A discloses a 3D printing process for polyurethane compositions, which involves an additional heat curing step after the printing process. This limits the possible geometry and size of the printed moldings and limits the efficiency and speed of the process by the additionally required heat treatment.

Another approach would be to delay the curing of the polyurethane to be applied for some time, e.g. by using a catalyst which only becomes active after dissociation of a retarding agent associated thereto.

In general, polyurethanes would be very attractive for 3D printing because the available materials when cured allow for a wide range of mechanical properties and chemical and thermal resistance, and the raw materials are cheap and readily available. In addition, it is relatively easy to adjust the reactivity of two-part polyurethanes to a desired process, such as by the choice of the polyisocyanates or the curing catalyst. However, as mentioned above, there is always a compromise. Either the pot life (i.e. the time after mixing the components, during which the application of the composition is still possible) is very short for compositions that cure quickly and build strength, or the cure and strength build-up are slow when processing long pot life compositions which slows down the 3D printing, as it is necessary to wait for larger moldings until the lower layers have sufficiently cured.

According to the above, there is a need for two-component polyurethanes which are suitable for 3D printing processes, which upon mixing and within the time until which they are applied do build up only moderate viscosity, but cure very quickly after application, so that a 3D printing process with fast cycles can be performed. Especially desirable would be a process, which allows thermosetting moldings with largely freely adjustable mechanical properties, which consist of common, low-cost raw materials. In addition, there is a need for two-component polyurethanes which after having been processed by printing exhibit a low tackiness to shorten the time span after printing until an object can be further processed.

DESCRIPTION OF THE INVENTION

The object of the present invention was therefore the provision of corresponding two-component polyurethane compositions, which meets most and preferably all of the aforementioned demands. The object of the present invention was thus to provide two-component polyurethane compositions, which are suitable for 3D printing applications, wherein the two-component polyurethane compositions after mixing in the 3D printer only moderately build up viscosity and can be applied easily and without heating, but cure very quickly after application, so that a 3D printing process with fast cycles can be performed. In addition, it was the object of the invention to provide two-component polyurethane compositions, which after their application provide reduced tackiness compared to conventional two-component polyurethane compositions.

Surprisingly, this object is solved by two-component polyurethane compositions according to claim 1. The inventive two-component polyurethane composition comprises a polyol component comprising a tri- or higher functional polyol having a low to moderate molecular weight as specified below, a further di- or tri-functional polyether or polyester polyol and a polyisocyanate component comprising a polyisocyanate. For such compositions, it was found that in particular the tri or higher functional polyol provides for a significantly reduced tackiness of the processed polyurethanes, which makes the materials suitable for the production of models and tools in the automobile, marine and aeronautics industries.

The advantages of the two-component polyurethane compositions according to the invention and the possibility to process such compositions by 3D-printing are manifold:

E.g. in conventional methods to produce models boards of a standardized size based on polyurethanes and epoxy may be used, which can be cut and assembled to approach a final design. This process however, has the downside of a considerable processing time and a high amount of waste material, which is produced. Alternatively, models could be approached by mass casting of polyurethane and epoxy compositions, by which the production of waste material is reduced, but which on the other hand requires more effort to produce the shape for the casting, so that the process has limited flexibility. In addition, mass casting has limitations in term of the maximum size and variability of shapes to be produced.

A yet further conventional means to produce corresponding models are pastes based on 2-component systems which are extruded through a mixing machine and are manually applied on a pre-milled model before the composition is cured This process however, has the downside that it is necessary to first produce the model, on which the composition is applied, which is both costly and time consuming, and in addition, the time required to finally cure the two component system may be long.

It follows, that all of the above conventional methods share the disadvantage, that a considerable amount of time is necessary to produce a model and that a significant amount of human work is involved.

Against these processes, the possibility to print 3D models offers the advantage that 3D printing is much simpler and faster, and that a model can be much more closely approached by the printing than is possible with conventional processes thus reducing the waste and time which is involved in the final processing of the model. Further aspects of the invention are the subject of further independent claims. Particularly preferred embodiments of the invention are the subject of the dependent claims.

WAYS TO CARRY OUT THE INVENTION

In a first aspect, the present invention concerns a two-component polyurethane composition comprising
  a polyol component A comprising a tri- or higher functional polyol P1 having an OH equivalent weight of form 60 g/mol to 250 g/mol and a di- or tri-functional polyether or polyester polyol P2 which is different from the polyol P1; and
  an isocyanate component B comprising at least one polyisocyanate I.

The prefix "poly" in substance names such as "polyol", "polyisocyanate", "polyether" or "polyamine" indicates in this document that the respective substance formally contains more than one of the functional groups occurring in its name per molecule, The term "polymer" in the present document comprises on the one hand a collective of chemically uniform, but differing in terms of degree of polymerization, molecular weight and chain length macromolecules, which was prepared by a polyreaction (polymerization, polyaddition, polycondensation). On the other hand, the term also encompasses derivatives of such a collective of macromolecules from polyreactions, compounds which have been obtained by reactions, such as additions or substitutions, of functional groups on given macromolecules and which may be chemically uniform or chemically nonuniform. The term also includes so-called prepolymers, that is, reactive oligomeric pre-adducts whose functional groups are involved in the construction of macromolecules.

The term "polyurethane polymer" includes all polymers which are prepared by the so-called diisocyanate polyaddition process. This also includes those polymers which are almost or completely free of urethane groups. Examples of polyurethane polymers are polyether-polyurethanes, polyester-polyurethanes, polyether-polyureas, polyureas, polyester-polyureas, polyisocyanurates and polycarbodiim ides.

The term "molecular weight" designates the molar mass (in grams per mole) of a molecule or a molecular residue. The term "average molecular weight" designates the number average $M_n$ of a polydisperse mixture of oligomeric or polymeric molecules or molecular residues, which is usually determined by gel permeation chromatography (GPC) against polystyrene as a standard.

A temperature of 23° C. is referred to in this document as "ambient temperature". Weight percent, abbreviated wt %, means mass fractions of a constituent of a composition based on the total composition, unless otherwise specified. The terms "mass" and "weight" are used synonymously in this document.

The "OH equivalent weight" is the weight of the compound relative to the number of OH groups therein. E.g. if the compound has an absolute molecular weight of 750 g/mol and contains three OH groups, the OH equivalent weight is 750/3=250 g/mol.

As a "primary hydroxyl group" an OH group is referred to, which is bonded to a carbon atom with two hydrogens.

The term "pot life" in this document refers to the time during which the polyurethane composition can be processed after mixing the two components before the viscosity, due to the progress of the crosslinking reaction, becomes too high for further processing.

The term "strength" in the present document refers to the strength of the cured composition. Strength in particular means the tensile strength and the modulus of elasticity (E-modulus), in particular in the expansion range of 0.05 to 0.25%.

The term "pumpable" means that the material in question is at least fluid enough to be pumped or generally conveyed by pressure, for example, in a hose or tube. Preferably, "pumpable" means that the material is pumpable at ambient temperature. However, it may be advantageous to slightly increase the pumpability by heating the material, e.g. to 30 to 60° C.

The terms "stable upon storage" or "storable" mean that a substance or composition can be stored at ambient temperature in a suitable container for extended periods of time, typically at least 3 months to 6 months or more, without it their use or application properties, in particular the viscosity and the crosslinking rate, being changed by the storage to a relevant extent.

All industry standards and standards mentioned in the document refer to the versions valid at the time of filing the initial application.

3D printing is an encasing-free forming process. The material is applied layer by layer to produce three-dimensional objects. The application layer by layer is computer-controlled from one or more liquid or solid materials according to predetermined shapes.

Also referred to as "free-form construction", "3D printing" is understood in this document to mean a process for the production of shaped articles in which a deformable material is applied in several layers or smaller portions and forms a solid shaped article after curing. The layers are not applied by spraying.

The terms "dynamic mixing element" or "dynamic mixer" in the present document mean a component comprising movable elements, which is suitable to mix solid and/or liquid ingredients.

A "static mixer" or "static mixer" is a device for mixing fluids, in which only the flow movement causes the mixing, while the device does not have moving elements. The device in particular consists of flow-influencing elements, which are usually helical, lamellar or lattice-shaped, and which are arranged in a tube or cavity through which the fluid to be mixed flows.

A "large" model or object in the context of the present invention is an object which extends to at least 50 cm and preferably at least 1 m in at least two principle axis dimensions (i.e. x and y axis) wherein more preferably the model or object extends at least 50 cm and preferably at least 1 m in all three two principle axis dimensions (i.e. x, y and z axis).

As stated above, the polyol component A of the inventive two-component polyurethane composition contains at least one tri- or higher functional polyol P1 having an OH equivalent weight in the range of 60 g/mol to 250 g/mol. Suitable polyols P1 are thus in principle all tri- or higher functional polyols which have a corresponding molecular weight, and which can e.g. be based on appropriate tri- or higher functional starter molecules such as alcohols (e.g. glycerol) or amines.

Preferred in the practice of the invention are tri- or higher functional polyols, which are polyetherpolyols. Even more preferred are tri- or higher functional polyether polyols which are reaction products of an alkylene oxide with an amine, preferably an aliphatic amine and even more preferably an aliphatic amine having one or more primary amino groups. A preferred reaction product of an alkylene oxide with an amine of this type is e.g. a reaction product of an alkylene oxide with ethylenediamine.

As concerns the alkylene oxide it is preferred that this a C2 to C4-alkylene oxide, i.e. ethylenoxide, propylene oxide or 1,2-butylene oxide, or a mixture of these alkylene oxides.

In one embodiment, the tri- or higher functional polyol comprises an ethylene diamine-started tetrafunctional polyetherpolyol having an OH equivalent weight of about 72 and which is commercially available under the tradename Multranol® E-9181 from Covestro. In another embodiment, the tri- or higher functional polyol comprises an ethylene-diamine-started tetrafunctional polyetherpolyol having an OH equivalent weight of about 90 and which is commercially available under the tradenames Desmophen® 4050E or Multranol® 4050 from Covestro.

In yet another embodiment the tri- or higher functional polyol comprises a trifunctional polyol, and in particular a trifunctional polyether polyol. Preferred trifunctional polyols of this type include polypropylenoxides based on glycerol as the starter molecule, which are commercially available as e.g. an Adiansol® TA 335 from Arkema.

Preferably, the polyol component A contains an amount of from about 8 to 30 wt.-%, and more preferably 9 to 25 wt.-% of the tri- or higher functional polyol P1. With respect to the total two-component composition the amount of the tri- or higher functional polyol P1 is 2 to 20 wt.-% and preferably 4 to 10 wt.-%.

The polyol component A of the inventive two-component polyurethane composition in addition contains a di- or trifunctional polyether or polyester polyol P2 which is different from the polyol P1.

Suitable polyether polyols as polyol P2 are in particular those which are polymerization products of ethylene oxide, 1,2-propylene oxide, 1,2- or 2,3-butylene oxide, oxetane, tetrahydrofuran or mixtures thereof, optionally polymerized with the aid of a starter molecule having two or more active hydrogen atoms such as, for example, water, ammonia or compounds with several OH or NH groups such as 1,2-ethanediol, 1,2- and 1,3-propanediol, neopentyl alcohol, diethylene glycol, triethylene glykol, the isomeric dipropylene glykol and tripropylene glycols, the isomeric butanediols, pentanediols, hexanediols, heptenediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the compounds mentioned. Both polyoxyalkylene polyols which have a low degree of unsaturation (measured to ASTM D 2849-69 and expressed in milliequivalents of unsaturation per gram of polyol (mEq/g)), for example prepared with the use of so-called double metal cyanide complex catalysts (DMC catalysts), and polyoxyalkylene polyols having a higher degree of unsaturation, for example produced with the aid of anionic catalysts such as NaOH, KOH, CsOH or alkali metal alkoxides, can be used.

Particularly suitable are polyoxyethylene polyols and polyoxypropylene polyols, in particular polyoxyethylene diols, polyoxypropylene diols, polyoxyethylene triols and polyoxypropylene triols.

Specifically suitable are polyoxyalkylenediols having a molecular weight in the range of from 1,000 to 10,000 g/mol, and preferably 2.000 to 6.000 g/mol. Preferably such polyoxyalkylenediols have a degree of unsaturation lower than 0.02 meq/g.

Also particularly suitable are so-called ethylene oxide-terminated ("EO-endcapped", ethylene oxide-endcapped) polyoxypropylene polyols. The latter are special polyoxypropylene polyoxyethylene polyols, which can be obtained e.g. from pure polyoxypropylene polyols, in particular polyoxypropylene diols and triols, after completion of the polypropoxylation reaction, by further alkoxylating the same with ethylene oxide to thus generate primary hydroxyl groups. In this case, preference is given to polyoxypropylene-polyoxyethylene diols and polyoxypropylene-polyoxyethylene triols.

Suitable polyester polyols are in particular polyesters which carry two or three hydroxyl groups and are prepared by known processes, in particular the polycondensation of hydroxycarboxylic acids or the polycondensation of aliphatic and/or aromatic polycarboxylic acids with dihydric or polyhydric alcohols.

Particularly suitable are polyester polyols which are prepared from dihydric to trihydric alcohols, for example 1,2-ethanediol, diethylene glycol, 1,2-propanediol, dipropylene glycol, 1,4-butanediol, 1,5-pentane diol, 1,6-hexanediol, neopentyl alcohol, glycerol, 1,1,1-trimethylolpropane or mixtures of the aforementioned alcohols with organic dicarboxylic acids or their anhydrides or esters such as succinic acid, glutaric acid, adipic acid, trimethyladipic acid, suberic acid, azelaic acid, sebiccinic acid, dodecane-dicarboxylic acid, maleic acid, fumaric acid, dimer fatty acid, phthalic acid, phthalic anhydride, isophthalic acid, terephthalic acid, dimethyl terephthalate, hexahydrophthalic acid, Trimellitic acid and trimellitic acid anhydride or mixtures of the above-mentioned acids, as well as polyester polyols from lactones such as, for example, ε-caprolactone.

Particularly suitable are polyesterdiols, in particular those which are prepared from adipic acid, azelaic acid, sebacic acid, dodecanedicarboxylic acid, dimer fatty acid, phthalic acid, isophthalic acid, terephthalic acid as the dicarboxylic acid or from lactones such as ε-caprolactone and from ethylene glycol, diethylene glycol, neopentyl glycol, 1,4-butanediol, 1,6-hexanediol, dimer fatty acid diol and 1,4-cyclohexane dimethanol as dihydric alcohol.

Preferred as polyol P2 are polyether polyols, in particular polyether diols, and especially polyether diols having an average molecular weight Mn in the range of 1.000 to 10.000 g/mol, and preferably 2.000 to 6.000 g/mol. Especially preferred polyols of this type is available as Lupranol® 2043 from BASF.

For the polyol P2, it is preferred that its amount in the polyol component A is from about 8 to 30 wt.-%, and more preferably 10 to 20 wt.-%. With respect to the two-component composition the amount of the polyol P2 is 4 to 15 wt.-% and preferably 5 to 12 wt.-%.

For the polyol component A, it is in addition preferred that it comprises a further polyol P3, which is different from both the polyols P1 and P2, and which in a preferred embodiment has a lower molecular weight than the polyol P2. As preferred molecular weights for the polyol P3, thus, an average molecular weight of from 100 to 600 and preferably 200 to 400 g/mol can be mentioned.

For the polyol P3, it is moreover preferred that it is a polyetherpolyol, and in particular a polyether triol. A particular suitable polyether triol is the reaction product of glycerol with propylene oxide having an average molecular weight Mn of about 260, which as available as Voranol® CP 260 from DOW Chemical.

The content of the polyol P3, if present is preferable in the range of 10 to 40 wt.-%, 10 to 35 wt.-%, 10 to 30 wt.-%, more preferably about 10 to 25 wt.-%, and most preferably 12 to 18 wt.-%. With respect to the two-component composition the amount of the polyol P2 is 4 to 15 wt.-% and preferably 6 to 12 wt.-%.

The isocyanate component of the inventive two-component polyurethane composition comprises at least one polyisocyanate I as constituent of the isocyanate component B. As polyisocyanates I, it is possible to use all customary polyisocyanates, especially diisocyanates, which are suitable for the preparation of polyurethanes.

Suitable polyisocyanates are in particular monomeric di- or triisocyanates, as well as oligomers, polymers and derivatives of the monomeric di- or triisocyanates, as well as any desired mixtures thereof.

Suitable aromatic monomeric di- or triisocyanates are, in particular, 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), mixtures of MDI and MDI homologues (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODD, dianisidine diisocyanate (DADI), 1,3,5-tris-(isocyanatomethyl)benzene, tris-(4-isocyanatophenyl) methane and tris (4-isocyanatophenyl)thiophosphate.

Suitable aliphatic monomeric di- or triisocyanates are, in particular, 1,4-tetramethylene diisocyanate, 2-methylpentamethylene-1,5-diisocyanate, 1,6-hexamethylene diisocyanate (HDI), 2,2,4- and 2,4,4 Trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and 1,4-diiso-cyanate, 1-methyl-2,4- and -2,6-diisocyanatocyclohexane and any mixtures of these isomers (HTDI or $H_6$TDI), 1-isocyanato-3,3,5-trimethyl-5-isocyanatomethyl-cyclohexane (=Isophorone diisocyanate or IPDI), perhydro-2,4'- and -4,4'-diphenylmethane diisocyanate (HMDI or $H_{12}$MDI), 1,4-diisocyanato-2,2,6-trimethylcyclohexane (TMCDI), 1,3- and 1,4-bis (isocyanatomethyl)cyclohexane, m- and p-xylylene diisocyanate (m- and p-XDI), m- and p-tetramethyl-1,3- and 1,4-xylylene diisocyanate (m- and p-TMXDI), bis (1-isocyanato-1-methyl-ethyl) naphthalene, dimer and trimer fatty acid isocyanates such as 3,6-bis(9-isocyanatonyl)-4,5-di -(1-heptenyl) cyclohexene (dimeryl diisocyanate) and $\alpha,\alpha,\alpha',\alpha', \alpha'',\alpha''$-hexamethyl-1,3,5-mesitylene diisocyanate.

Form among the above, MDI, TDI, HDI and IPDI and preferred and MDI is particularly preferred.

Suitable oligomers, polymers and derivatives of said monomethyl di- and triisocyanates are in particular derived from MDI, TDI, HDI and IPDI. Particularly suitable of these are commercially available types, in particular HDI biurets such as Desmodur® N 100 and N 3200 (from Covestro), Tolonate® HDB and HDB-LV (from Vencorex) and Duranate® 24A-100 (from Asahi Kasei); HDI isocyanurates such as Desmodur® N 3300, N 3600 and N 3790 BA (all from Covestro), Tolonate® HDT, HDT-LV and HDT-LV2 (from Vencorex), Duranate® TPA-100 and THA-100 (from Asahi Kasei) and Coronate® HX (from Nippon Polyurethane); HDI uretdiones such as Desmodur® N 3400 (from Covestro); HDI-iminooxadiazinediones such as Desmodur® XP 2410 (from Covestro); HDI allophanates such as Desmondur® VP LS 2102 (from Covestro); IPDI isocyanurates, such as in solution as Desmodur® Z 4470 (from Covestro) or in solid form as Vestanat® T1890/100 (from Evonik); TDI oligomers such as Desmodur® IL (from Covestro); and mixed isocyanurates based on TDI/HDI, for example as Desmodur® HL (from Covestro). Also suitable are liquid forms of MDI (so-called "modified MDI") which are mixtures of MDI with MDI derivatives, in particular MDI carbodiimides or MDI uretonimines or MDI urethanes, known under trade names such as Desmodur® CD, Desmodur® PF, Desmodur® PC (all from Covestro) or Isonate® M 143 (from Dow), and mixtures of MDI and MDI homologues (polymeric MDI or PMDI) available under trade names such as Desmodur® VL, Desmodur® VL50, Desmodur® VL R10, Desmodur® VL R20, Desmodur® VH 20N and Desmodur® VKS 20F (all from Covestro), Isonate® M 309, Voranate® M 229 and Voranate® M 580 (all from Dow) or Lupranate® M 10 R (from BASF). In practice, the abovementioned oligomeric polyisocyanates are usually mixtures of substances with different degrees of oligomerization and/or chemical structures. They preferably have an average NCO functionality of 2.1 to 4.0.

Preferably, the polyisocyanate is selected from the group existing consisting of MDI, TDI, HDI and IPDI and oligomers, polymers and derivatives of said isocyanates, and mixtures thereof.

Especially preferred as the polyisocyanate I are liquid forms of MDI at ambient temperature. These are in particular so-called polymeric MDI and MDI with proportions of oligomers or derivatives thereof. The content of MDI (=4, 4'-, 2,4'- or 2,2'-diphenylmethane diisocyanate and any mixtures of these isomers) of such liquid forms of MDI is in particular 50 to 95 wt.-%, in particular 60 to 90 wt.-%. With these polyisocyanates particularly good processing properties and high strengths are obtained.

The polyisocyanate I of the isocyanate component B may contain fractions of isocyanate group-containing polyurethane polymers. Either the second component may comprise a separately produced isocyanate group-containing polyurethane polymer, or the polyisocyanate has been mixed with at least one polyol, especially a polyether polyol, wherein the isocyanate groups are present in a stoichiometric excess over the OH groups.

In the two-component composition according to the invention, the polyisocyanate I is preferably present in an amount of 10% by weight to 38% by weight, in particular 15% by weight to 33% by weight, particularly preferably 20% by weight to 30% by weight, based on the total composition.

The amount of polyisocyanate I, which is incorporated into the inventive two-component polyurethane composition is preferable such that the amount of OH in the polyol component A is about balanced with the amount of isocyanate in the isocyanate component B. Thus, in a preferred embodiment, the NCO/OH ratio is from about 1.2 to 1, preferably from about 1.15 to 1.05.

Next to the constituents described hereinbefore, the inventive two-component polyurethane composition may further comprise a polyamine PA to adjust and fine tune properties such as the yield stress. If present, such polyamine is present in the polyol component A.

Suitable polyamines PA are customary polyamines used in polyurethane chemistry, in particular diamines. However, more suitable are hydrophobic polyamines, especially aromatic polyamines. Particularly preferred polyamines PA are aromatic diamines which have the formula (II):

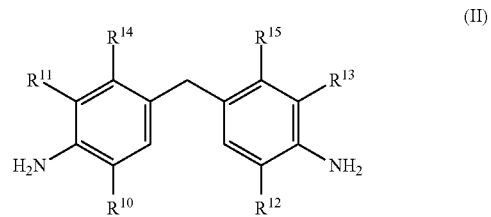

wherein $R^{10}$, $R^{11}$, $R^{12}$ and $R^{13}$ are each H or a linear or branched $C_1$- to $C_4$-alkyl group, with the proviso that $R_{11}$ and $R_{13}$ are not simultaneously H. Furthermore, $R^{14}$ and $R^{15}$ are each H or a chlorine atom.

Especially preferred are 4,4'-methylenebis (3-chloro-2,6-diethyl)-aniline, 4,4'-methylenebis(3-chloro-2,6-diethylaniline), 4,4'-methylenebis(2,6-diethylaniline), 4,4'-methylenebis(2,6-diisopropylaniline) and 4,4'-methylenebis(2-isopropyl-6-methylaniline). Such aromatic polyamines are preferred over other aromatic polyamines, as they are toxicologically advantageous aromatic polyamines. More preferably, the polyamine (PA) is 4,4'-methylenebis(2,6-diethylaniline). In an especially preferred embodiment the polyamine PA is a mixture of 4,4'-methylenebis(2,6-diethylaniline) and bis-(p-aminocyclohexyl) methane.

Concerning the content of polyamines PA in the polyol component A, furthermore, it is preferred that the polyol component A contains the at least one polyamine PA in an amount of 0.5 to 5 wt.-%, preferably from 0.5 to 1.5 wt.-%. In addition, it is preferred that the content of polyamines PA in the entire two-component polyurethane composition is from 0.2 to 2 wt.-% and more preferably form 0.3 to 1.2 wt.-%.

A further preferred constituent of the inventive two-component polyurethane compositions are light weight fillers (i.e. fillers having a bulk density of less than 0.5 g/cm³, more preferably less than 0.3 g/cm³ and even more preferably about 0.1 to 0.26 g/cm³. Particularly suitable light weight filler of this type are microspheres, in particular hollow microspheres such as those based on glass or plastic materials (e.g. Expancel®) and especially hollow glass microspheres. A corresponding material is commercially available as 3M™ Glass Bubbles K25, K20, K46, S22, or H20/1000 from 3M. Other hollow fillers, which can be used, include Expancel® 920 DE form AkzoNobel, FILLITE SG 500 from Omya, ECCOSPHERES® SI-200 or SI-200 Z from Trelleborg, Q-CEL® 7040 or 6717 or SPHERICEL® 25P45 or 60P18 from Potters Industries Inc.

Depending on the intended density of a three dimensional object to be prepared with a corresponding two-component polyurethane composition, the light weight filler can be incorporated in an appropriate amount. However, in the context of the present application it has been found that particularly suitable two-component polyurethane compositions can be formed with a light weight filler content of about 5 to 35 wt.-% and in particular 10 to 25 wt.-%, relative to the total weight of the two-component polyurethane composition.

For the light weight filler, in addition to the density, the particle size is also relevant, as if the particle size too high the resulting viscosity may by disadvantageously low, whereas a too low particle size may results in a disadvantageously high viscosity. In general, it is thus advantageous if the mean particle size d50 (by volume) of the light weight filler is in the range of from 10 to 150 μm and in particular 30 to 100 μm. Such particle sizes can conventionally be determined by laser diffraction.

Preferred further constituents are inorganic and organic fillers, such as, in particular, natural, ground or precipitated calcium carbonate, which are optionally coated with fatty acids, in particular stearic acid, barite, talc, quartz flour, quartz sand, dolomites, wollastonites, kaolins, calcined kaolins, mica (potassium aluminum silicate), molecular sieves, aluminum oxides, aluminum hydroxides, magnesium hydroxide, silicic acids including highly dispersed silicas from pyrolysis processes, industrially produced carbon blacks, graphite, metal powders such as aluminum, copper, iron, silver or steel, or PVC powder, as well as flame retardant fillers, such as hydroxides or hydrates, in particular hydroxides or hydrates of aluminum, preferably aluminum hydroxide.

The addition of such fillers is advantageous in that it increases the strength of the cured polyurethane composition.

If the polyurethane composition contains at least one filler, this filler is preferabyl selected from the group consisting of calcium carbonate, carbon black, kaolin, barite, talc, quartz powder, dolomite, wollastonite, kaolin, calcined kaolin and mica. Particularly preferred fillers are ground calcium carbonates, calcined kaolins or carbon black.

The content of filler in the composition, if present, is preferably in the range of 5 to 50% by weight. If the filler is a light weight filler, the content thereof is preferably 6% by weight to 20% by weight, in particular 10% by weight to 15% by weight, based on the total composition.

As yet further constituents, the inventive two-component polyurethane composition may comprise solvents, plasticizers and/or extenders, pigments, rheology modifiers (such as urea compounds of the type described as thixotropic endowing agent in WO 02/48228 A2 on pages 9 to 11, polyamide waxes, bentonites, clay or fumed silicas,.in particular hydrophobic fumed silica), drying agents such as, in particular, zeolites, adhesion promoters such as, in particular, organofunctional trialkoxysilanes, stabilizers against oxidation, heat, light and UV radiation, flame-retardant substances, and surface-active substances, in particular as wetting agents and defoamers.

If the two-component polyurethane composition comprises a rheology modifier, this constituent is preferably present in an amount of from 1 to 12 wt.-% and in particular 3 to 8 wt.-%, relative to the total weight of the two-component polyurethane composition.

Suitable plasticizers for use in the inventive two-component polyurethane composition include adipic acid based plasticizers such as doctyladipate (or bis(2-ethylhexyl) hexanedioate), phthalate based plasticizers such as di-isononyle phthalate, silicon oil and hydrocarbon plasticizers such as those available as Isopar® M from Exxon. In a preferred embodiment, the inventive two-component polyurethane composition comprises a mixture of adipic acid based plasticizers and hydrocarbon plasticizers, more preferably in a ratio of about 3-4:1.

The content of the plasticizers in the inventive two-component polyurethane composition is generally in the range of 5 to 35 wt.-%, preferably in the range of 10 to 25 wt.-% and more preferably 12 to 20 wt.-%.

It is further preferred if the inventive two-component polyurethane composition contains less than 20 wt.-%, less than 15 wt.-%, less than 10 wt.-%, less than 5 wt.-%, less than 2 wt.-%, less than 1 wt.-%, based on the total two-component polyurethane composition, of polyhydroxy-functional fats and oils, for example natural fats and natural oils, especially castor oil, or polyols obtained by chemical modification of natural fats and oils, so-called oleochemical polyols. Low amounts of said polyhydroxy-functional fats and oils is advantageous with respect to a lower viscosity of the two-component polyurethane composition directly after mixing of the polyol component A with the isocyanate component B.

Examples of chemically modified natural fats and oils are polyols obtained from epoxypolyesters or epoxypolyethers obtained, for example, by epoxidation of unsaturated oils, by subsequent ring opening with carboxylic acids or alcohols, polyols obtained by hydroformylation and hydrogenation of unsaturated oils, or polyols which are obtained from natural fats and natural oils by degradation processes, such as alcoholysis or ozonolysis, and subsequent chemical linkage, for example by transesterification or dimerization, of the degradation products thus obtained or derivatives thereof. Degradation products of natural fats and oils are in particular fatty acids and fatty alcohols and fatty acid esters, in particular the methyl esters (FAME), which can be derivatized, for example, by hydroformylation and hydrogenation to give hydroxy-fatty acid esters. These polyols mentioned above usually have a relatively high molecular weight, for instance, an average molecular weight of from 250 to 30000 g/mol, in particular from 1000 to 30000 g/mol, and/or an average OH functionality in the range from 1.6 to 3.

It can also be further preferred if the inventive two-component polyurethane composition contains less than 20 wt.-%, less than 15 wt.-%, less than 10 wt.-%, less than 5 wt.-%, less than 2 wt.-%, less than 1 wt.-%, based on the total two-component polyurethane composition, of polybutadiene polyols having an average molecular weight in the range from 2'000 to 10'000 g/mol and an average OH functionality in the range from 2.1 to 4.

Such a polybutadiene polyol is especially obtainable by polymerization of 1,3-butadiene and allyl alcohol in a suitable ratio or by oxidation of suitable polybutadienes. Such a polybutadiene polyol is for example Poly bd® R-45HTLO or Poly bd® R-45M (both from Cray Valley).

The above mentioned constituents of the inventive two-component polyurethane composition are regularly formulated such that the constituents comprising functional groups, which are reactive towards NCO-groups are kept separate from the polyisocyanates. On the other hand, any compounds which contain no functional groups, which are reactive towards NCO-groups, can be formulated as constituents of either the polyol component A or the isocyanate component B, or in both of them.

Preferred two-component polyurethane composition for the preparation of model have densities of from 0.5 to 1.0 g/cm$^3$ and in particular 0.7 to 0.8 g/cm$^3$.

A highly preferred two-component polyurethane composition according to the invention comprises:

- 2 to 20 wt.-%, preferably 5 to 10 wt.-% of the tri- or higher functional polyol P1;
- 4 to 15 wt.-%, preferably 5 to 12 wt.-% of the di- or tri-functional polyol P2;
- 4 to 35 wt.-%, 4 to 15 wt.-%, preferably 6 to 12 wt.-% of the polyol P3;
- 0.2 to 2 wt.-%, preferably 0.3 to 1.2 wt.-% of a polyamine PA;
- 5 to 35 wt.-%, preferably 10 to 25 wt.-% of hollow microspheres;
- 5 to 35 wt.-%, preferably 10 to 25 wt.-%, of one or more plasticizers;
- 1 to 12 wt.-%, preferably 3 to 8 wt.-% of a rheology modifier and , preferably 25 to 30 wt.-% of one or more polyisocyanates;

as well as optionally further constituents.

A preferred polyurethane composition contains an isocyanate component B, which contains 40 to 100 wt.-%, in particular 45 to 80 wt.-%, polyisocyanate I. Especially preferred the polyisocyanate I is present in an amount of 15% by weight to 33% by weight, particularly preferred 20% by weight to 30% by weight, based on the total composition.

The polyol and isocyanate components are advantageously formulated in such a way that their mixing ratio in parts by weight and parts by volume is in the range from 10:1 to 1:10. Particularly preferred is a volume mixing ratio of 5:1 to 1:5, in particular 2:1 to 1:2, most preferably 1:1. Such a mixing ratio allows a particularly homogeneous mixture and a particularly accurate delivery of the components.

The polyurethane composition is pumpable immediately after mixing components A and B at 23° C., in particular flowable. It is preferred that the components A and B and the mixture of the two components of the composition are thixotropic, that is, have a lower viscosity under higher shear forces. Thixotropy can be achieved, for example, by thixotropic additives well known to those skilled in the art.

The polyol component A and the isocyanate component B and the inventive two-component polyurethane composition directly after mixing of the polyol component A with the isocyanate component B preferably have a viscosity, measured at 20° C. on a plate-plate viscometer with plate spacing 1 mm and plate diameter 25 mm, of <10'000 Pa·s, preferably <5000 Pa·s, at a shear rate of $0.01\ s^{-1}$ and <1000 Pa·s, preferably <500 Pa·s, at a shear rate of $1\ s^{-1}$ and <200 Pa·s, preferably <100 Pa·s, at a shear rate of $10\ s^{-1}$.

Preferably, the polyol component A and the isocyanate component B each have a viscosity, measured at 20° C. on a plate-plate viscometer with plate spacing 1 mm and plate diameter 25 mm, less than 100 Pa·s at a shear rate of $10\ s^{-1}$.

The viscosity can be adjusted by formulation measures, for example the selection of polyols and/or fillers and the use of low viscosity additives such as plasticizers by routine experimentation. Likewise, a shear-thinning behavior, i.e. the thixotropy, as described above, can be achieved, if appropriate, by using thixotropic additives.

The preparation of the two components A and B is carried out separately and preferably with the exclusion of moisture. Both components are typically each stored in a separate container. A suitable container for storing the respective component is in particular a barrel, a hobble, a bag, a bucket, a can, a cartridge or a tube. The components are both stable on storage, which means that they can be stored for several months to a year or longer before use, without changing their relevant properties.

The two components A and B are stored separately from each other before mixing the composition and mixed together only at or immediately before use. They are advantageously present in a packaging which consists of two separate chambers.

In a second aspect, the present invention concerns a process for preparing a three dimensional object from a two-component polyurethane composition as specified above by means of 3-D printing, the process comprising the steps of Providing a pumpable polyol component A as described above;

Supplying the polyol component A, in particular by means of a pump, to a continuous mixer comprising an inlet, a mixing area with at least one static or dynamic mixing element connected to the inlet, an outlet into which the mixing area opens, wherein the polyol component A is conveyed through the at least one inlet into the mixing area;

Supplying a pumpable isocyanate component B into the mixing zone of the continuous mixer, wherein the isocyanate component B comprises at least one polyisocyanate I;

Mixing the polyol component A with the isocyanate component B in the mixing zone of the continuous mixer to form a mixed, curable polyurethane composition;

Conveying the mixed, curable polyurethane composition to the outlet; and layer-wise applying the mixed, curable polyurethane composition, in particular by means of a movable print head.

Mixing before or in the 3D printer according to the method according to the invention is typically carried out by means of static mixers or with the aid of dynamic mixers.

When mixing, it is to be observed that the two components are mixed as homogeneously as possible. If the two components are mixed incompletely, local deviations from the favourable mixing ratio occurs, which may result in a deterioration of the mechanical properties.

Upon contact of the polyol component A with the isocyanate component B, curing commences by chemical reaction. The hydroxyl groups and any other isocyanate-reactive substances react with the isocyanate groups. Excess isocyanate groups react predominantly with moisture. As a result of these reactions, the polyurethane composition cures to a solid material. This process is also called crosslinking.

The two components A and B are fed from the place of provision to the continuous mixer, preferably by means of a pump and a delivery line, in particular a hose. It is also possible that the mixer is attached directly to the container of the two components A and B and the mixed mixture of the two components A and B is conveyed via a conveyor line, in particular a hose, to the print head. Preferably, the two components A and B and their mixture are well conveyed. Good conveyability is important for 3D printing because it is normally a prerequisite or at least advantageous for a homogeneous application. Especially for the printing of large molded parts, the length of a delivery line between pump and mixer can reach up to several meters and more, which can lead to high pressure in the delivery line. A high pressure, especially in a hose, is undesirable, because the material is heavily stressed and can burst in case of overload. Well-conveyable compositions can prevent excessive pressure build-up.

Preferably, the pressure in the delivery line between the pump and the continuous mixer is below 40 bar, more preferably below 25 bar.

The conveying of the component A and the component B and optionally further additives to the mixer occurs, for example, via one or more conveyor devices, in particular pumps and delivery lines. The conveyor devices are controllable in particular via a control unit, in particular independently of each other.

Preferably, the static or continuous mixer is mounted on a movable printhead. Preferably, the printhead has a discharge nozzle for the layered application of the mixed polyurethane composition.

In one embodiment, the static or dynamic continuous mixer is mounted on the movable printhead immediately adjacent to this discharge nozzle. As a result, the temporal strength development of the mixed polyurethane composition can additionally be adjusted specifically.

The residence time of the two-component polyurethane composition to be mixed or mixed in the mixer is preferably less than 30 s, more preferably less than 20 s, particularly preferably less than 15 s. The mean residence time of the binder composition in the mixing device is the time duration that a particle in the mixing device, from inlet to outlet, lingers on average.

The mixed polyurethane composition is readily deformable immediately after blending component B into component A and can be applied to the printhead in homogeneous layers. These layers are self-supporting immediately or at the latest after a short time and show a rapid strength development. Subsequent layers can therefore be applied at short distances and at heights of less than one millimeter up to several centimeters without problems to the underlying layers.

The mixed two-component polyurethane composition is preferably applied via a movable printhead.

In particular, the printhead has at least one discharge opening, which may be identical to the outlet of the continuous mixer, through which the curable material can be discharged.

The good stability of the applied layers makes the use of support elements or fasteners unnecessary.

Preferably a discharge nozzle is located at the discharge opening, which forms the discharged material. The shape of the discharge nozzle is not limited. Preferably, the discharge nozzle has a rectangular, square or round shape. The diameter of the discharge nozzle is also not particularly limited. With very small diameters and at the same time high viscosity of the composition, higher pressures are required for discharging. It has proven to be advantageous to use nozzles with outlet openings with diameters of 0.5 mm to 1 cm, preferably 1 mm to 5 mm, in particular 2 mm to 4 mm. In the discharge nozzle even more shaping elements can be attached.

In a preferred variant, the printhead is movable in one, two or three spatial directions. Particularly preferred is a printhead which is movable in three spatial directions. As a result, almost any shaped body can be produced in a particularly simple manner.

In particular, the movement of the printhead can be realized by mounting the printhead on a conventional robotic arm which is movable in one, two or three spatial directions. Preferably, the printhead is on a 3-axis gantry robot system. This allows the rapid printing of large moldings with flexible design. It is also possible to realize movements in one, two or three spatial directions by corresponding movements of the installation space area. The building space area is the area, for example a surface, on which the shaped body is built up.

With the method according to the invention, three dimensional objects can be produced surprisingly quickly by layer-by-layer application. The height of a single layer, typically measured in a direction substantially perpendicular to the planes formed by individual layers, in particular in the vertical direction, is preferably 0.5 mm to 10 mm, more preferably 1 mm to 5 mm, in particular 2 mm up to 4 mm. The total height of the three dimensional object or the thickness of all individual layers of the three dimensional object taken together is preferably 1 cm to 50 cm or more, more preferably 5 cm to 40 cm, even more preferably 10 cm to 35 cm.

On the one hand, the surface of the three dimensional object can be smoothed, corrected or specially shaped before or after the formation of a completely dry skin, with suitable tools or materials. If the skin has completely dried, this can be done as part of machining, or manually as a separate step. The surface may also be provided with a functional or decorative coating, or parts may be embedded therein.

After complete curing, the molded part can also be further processed, for example by grinding, cutting, milling, water jet or laser treatment or other abrasive, cutting or smoothing techniques. As a result, the shape of the molded part can be further adapted, for example if the surface structure or the molded part dimension does not yet meet the requirements.

The three dimensional object can also be cut with suitable tools both before and after complete curing. Thus, holes, openings, recesses or cuts, in particular for subsequent processing steps, can be introduced into the three dimensional object.

The three dimensional object produced by the method according to the invention can have virtually any desired shape. The three dimensional object is, for example, a part of an article of manufacture such as a shoe sole, a finished part for an industrial building, a prototype, a design study, a spare part or an artistic object. In this case, the molded body can be a full mold or a hollow mold, with or without a bottom.

A yet further aspect of the present invention is concerned with a three dimensional object prepared according to the process as described above.

A yet further aspect of the present invention is concerned with the use of a two-component polyurethane composition as specified above as the material to be printed in a 3-D printing process In the following the invention will be further explained by examples, which are not intended to limit the invention in any way.

EXAMPLES

Used Compounds

TABLE 1

| used compounds | |
|---|---|
| Desmophen ® 4050E | Tetrafunctional polyetherpolyol, hydroxy number 595-645 mg KOH/g, viscosity 17000-21400 mPa · s at 25° C., from Covestro |
| Voranol ® CP 260 | Trifunctional polyetherpolyol, hydroxy number 647-676 mg KOH/g, viscosity 910 mPa · s at 25° C., from Dow Chemical |
| Voranol ® CP 450 | Trifunctional polyetherpolyol, hydroxy number 370-396 mg KOH/g, from Dow Chemical |
| Voranol ® EP 1900 | Ethylene oxide capped polyoxypropylenediol, hydroxy number 26-29 mg KOH/g, from Dow Chemical |
| Amicure ® PACM | Bis-(p-aminocyclohexyl) methane, from Evonik |
| M-DEA | 4,4'-Methylenebis(2,6-diethylaniline) |
| Plastomoll ® DOA | Bis(2-ethylhexyl)hexanedioate from BASF |
| Isopar ® M | Hydrocarbon oil plasticizer, from Exxon |
| 3M ™ Glass Bubbles K25 | Hollow glass bubbles, density 0.25 g/cm$^3$, mean particle diameter 55 μm, from 3M |
| CAB O SIL ® TS 720 | Hydrophobic fumed silica, from Cabot |
| Suprasec ® 2211 | Polymeric MDI, from Huntsman |

Example 1: Preparation of Components A and B

For each composition, the ingredients indicated in Table 2 below were processed in the stated amounts (in parts by weight or % by weight) of the polyol component A by means of a vacuum dissolver with exclusion of moisture to form a homogeneous paste and kept airtight. Likewise, the ingredients of the isocyanate component B indicated in the tables were processed and stored. The two components were each filled into a compartment of an airtight double cartridge.

TABLE 2

| Polyol component A | | Isocyanate component B | |
|---|---|---|---|
| Constituent | Amount (wt.-%) | Constituent | Amount (wt.-%) |
| Tetrafunctional polyol | 10% | Polymeric MDI | 56.2% |
| Di-and tri-functional polyether polyols | 40.5% | Plasticizer | 16.9% |
| Amine PA | 0.7% | Glass microsphere | 16.1% |
| Glass microsphere | 15% | Hydrophobic fumed silica | 5.5% |
| Plasticizer | 17.9% | Molecular sieve, degassing agent | Up to 100 |
| Hydrophobic fumed silica | 7% | TOTAL | 100 |
| Molecular sieve, degassing agent, colouring agent | Up to 100 | | |
| TOTAL | 100 | | |

Printing Test

The above-mentioned double cartridge (one cartridge of the dual cartridge containing polyol component A and the isocyanate component B, both components according to the table of contents in Table 2) was connected to a 3D printer so that the cartridge outlet emptied into a 15.9 cm long static mixer.

The outlet of the static mixer ended in a hose which was connected to the print head of the 3D printer. The printhead had a circular outlet opening with a diameter of 2 mm.

The 3D printer used was a commercially available Delta WASP 2040 3D printer (WASP c/o CSP S.r.l., Italy). The double cartridge was squeezed out via a screw controlled piston at a flow rate of 16.5 mL/min. The two components A and B were mixed in the volume ratio A:B (v/v) of 1:1. The residence time in the mixer was about 55-60 s.

Thus, in a continuous process layer by layer a cylindrical hollow figure with a height of 35 cm, a wall thickness of 5 mm and a diameter of 4.5 cm could be printed within 10-11 min. The composition was stable and dimensionally stable immediately after application and consequently cured continuously, although the curing of one layer was not yet complete when a second layer was applied thereto. This allowed good cohesion between the layers. After about 55-60 minutes, the molding was solid and had formed a dry skin.

Examples 2

Based on the compositions as described below, an evaluation of the printing of the two mixed parts was performed. In these compositions, glass microspheres (K25) were used in both components. At a fixed extrusion speed (13 g/min), residence time was between 2 and 3 min. The two components A and B were mixed in the weight ratio A:B (wt./wt.) of 1:1.

TABLE 3

| | Formulation 2 | Formulation 3 | Formulation 4 | Formulation 5 |
|---|---|---|---|---|
| Polyol component A | | | | |
| Voranol CP 450 | 10.70 | 7.80 | 11.60 | 7.00 |
| Voranol CP 260 | 7.70 | 4.50 | 14.30 | 3.30 |
| Voranol EP 1900 | 10.20 | 23.00 | 10.20 | 23.00 |
| Desmophen 4050E | 22.50 | 8.00 | 15.00 | 10.00 |
| Amicure PACM | 0.5 | 0.5 | 0.5 | 0.5 |
| M-DEA | 0.5 | 0.5 | 0.5 | 0.5 |
| Plastomoll DOA | 10.20 | 19.70 | 10.20 | 19.70 |
| Isopar M | 7.20 | 7.20 | 7.20 | 7.20 |
| Molecular sieve | 5.30 | 5.00 | 5.30 | 5.00 |
| CAB O SIL ® TS 720 | 6.50 | 7.00 | 7.00 | 8.00 |
| 3M ™ Glass Bubbles K25 | 15.40 | 13.50 | 14.90 | 12.50 |
| Degassing agent | 0.20 | 0.20 | 0.20 | 0.20 |
| White coloring paste | 3.10 | 3.10 | 3.10 | 3.10 |
| Isocyanate component B | | | | |
| Suprasec 2211 | 56.80 | 56.80 | 56.80 | 56.30 |
| Plastomoll DOA | 16.90 | 16.90 | 16.90 | 16.90 |
| Molecular sieve | 4.90 | 4.90 | 4.90 | 4.90 |
| CAB O SIL ® TS 720 | 3.40 | 3.90 | 3.90 | 4.90 |
| 3M ™ Glass Bubbles K25 | 17.60 | 17.10 | 17.10 | 16.60 |
| Degassing agent | 0.40 | 0.40 | 0.40 | 0.40 |

The corresponding compositions were evaluated for their expression characteristics by means of a 3D-printing system. In these investigations, it was observed that upon continuous printing of the Formulation 2 the extrusion system showed a slight increase in pressure over time, indicating a potential disadvantage for continuous printing. When the amount of Desmophen® 4050E was decreased to below 20% as in Formulations 3 to 5, this effect was no longer observed.

The results of the determination of the gel time and tackiness perception after 1 h are provided in the below Table 4. The gel time was measured in a plastic cup containing 100 g mixing. With a wooden stick, the time when the mixture becomes thicker in comparison with the initial texture was determined. The tackiness was determined as the perception of tackiness by the touch.

TABLE 4

| Formulation | Desmophen ® 4050E [%] | Gel Time [min] | Tackiness |
|---|---|---|---|
| 3 | 8 | 7'56 | Ok after 1 h |
| 5 | 10 | 4'12 | Ok after 1 h |
| 4 | 15 | 3'50 | |

As is evident from Table 4, the inventive compositions provide desirable properties in terms of gel time and tackiness.

The invention claimed is:

1. A process for preparing a three dimensional object from a two-component polyurethane composition by means of 3-D printing, the two-component polyurethane composition comprising a polyol component A comprising a tri- or higher functional polyol P1 having an OH equivalent weight of from 60 g/mol to 250 g/mol and a di- or tri-functional polyether or polyester polyol P2 which is different from the polyol P1; and an isocyanate component B comprising at least one polyisocyanate I, wherein the polyol P1 is a reaction product of a polyamine, with an alkylene oxide, the polyol component A further comprises a polyether polyol P3 which is different from both the polyols P1 and P2, the polyol P1 is present in an amount of 8 to 30 weight % of the polyol component A, and the polyol P1 is present in an amount of 2 to 20 weight % of the composition, the process comprising the steps of providing the polyol component A in a pumpable form, supplying the polyol component A, to a continuous mixer comprising
an inlet,
a mixing area with at least one static or dynamic mixing element connected to the inlet,
an outlet into which the mixing area opens,
wherein the polyol A is conveyed through the at least one inlet into the mixing area;

supplying the isocyanate component B in a pumpable form into the mixing zone of the continuous mixer;

mixing the polyol component A with the isocyanate component B in the mixing zone of the continuous mixer to form a mixed, curable polyurethane composition;

conveying the mixed, curable polyurethane composition to the outlet; and layer-wise applying the mixed, curable polyurethane composition.

2. The process according to claim 1, wherein the mixer has a static or dynamic mixing element, which is mounted on a movable printhead.

3. The process according to claim 1, wherein the residence time of the mixed or to be mixed curable polyurethane composition in the mixer is less than 30 s.

4. A three dimensional object prepared according to the process of claim 1.

5. The process according to claim 1, wherein the polyol P1 is present in an amount of 9 to 25 weight % of the polyol component A, and the polyol P1 is present in an amount of 4 to 10 weight % of the composition.

6. The process according to claim 1, wherein the polyol P1 is present in an amount of 9 to 25 weight % of the polyol component A, the polyol P2 is present in an amount of 10 to 20 weight % of the polyol component A, and the polyol P3 is present in an amount of 12 to 18 weight % of the polyol component A.

* * * * *